United States Patent
Giannuzzi et al.

[19]

[11] Patent Number: 5,957,646

[45] Date of Patent: Sep. 28, 1999

[54] ENHANCED STRENGTH SCREW-TYPE MASONRY ANCHOR

[75] Inventors: Anthony C. Giannuzzi; Louis N. Giannuzzi, both of Stamford, Conn.

[73] Assignee: Anthony C. Giannuzzi, Stamford, Conn.

[21] Appl. No.: 09/184,265

[22] Filed: Nov. 2, 1998

[51] Int. Cl.⁶ .............................. F16B 35/04; F16B 39/30
[52] U.S. Cl. ........................... 411/412; 411/311; 411/414
[58] Field of Search ..................... 411/310, 311, 411/411, 412, 413, 414

[56] References Cited

U.S. PATENT DOCUMENTS

| | | | |
|---|---|---|---|
| 410,697 | 9/1889 | Rogers | 411/412 |
| 4,329,099 | 5/1982 | Shimizu et al. | 411/412 |
| 4,439,077 | 3/1984 | Godsted | 411/412 X |
| 4,652,194 | 3/1987 | Tajima | 411/414 X |
| 5,061,136 | 10/1991 | Dixon et al. | 411/412 |
| 5,531,553 | 7/1996 | Bickford | 411/414 X |

FOREIGN PATENT DOCUMENTS 54903  9/1889  Germany ................................ 411/411

*Primary Examiner*—Neill Wilson
*Attorney, Agent, or Firm*—Michael Ebert

[57] ABSTRACT

An enhanced strength screw-type, self-tapping masonry anchor for fastening a fixture or other attachment to masonry in which a hole is drilled to receive the anchor. The anchor is provided with a shank having a root section surrounded by at least one helical male cutting thread whose crest diameter exceeds the diameter of the hole whereby when the anchor is screwed into the hole, the cutting thread then cuts a female thread in the bank of the hole to mechanically retain the anchor therein to impart to the anchor a holding power that resists axial pull-out forces. Formed on the root in the helical land between successive convolutions of the thread is a ridge that is raised above the root to define a compacting zone between the ridge and the bank of the hole. Particulate debris produced by the cutting action is discharged into the land and forced into the compacting zone to create a dense mass that wedges the anchor in the hole and thereby enhances the holding power of the anchor.

11 Claims, 2 Drawing Sheets

ENHANCED STRENGTH SCREW-TYPE MASONRY ANCHOR

BACKGROUND OF INVENTION

1. Field of Invention

This invention relates generally to screw-type masonry anchors for fastening an attachment to masonry, the anchor being turned into a hole drilled in the masonry to mechanically retain the anchor therein, and more particularly to an anchor of this type having multiple lead cutting threads which enhance the holding power of the anchor.

2. Status of Prior Art

In order to fasten fixtures and other attachments to masonry, it is known for this purpose to use a screw-type anchor, such as the anchors disclosed in the Giannuzzi U.S. Pat. Nos. 5,118,496 and 5,282,708. In anchors of this type, a helical cutting thread is formed on the shank of the anchor which acts to cut and tap the bank of a hole drilled in the masonry when the anchor is turned into this hole; thereby mechanically retaining the anchor therein. The resistance of this anchor to axial pull-out forces represents its holding power.

The term masonry is generic to all stone-like building materials, such as concrete and brick. As pointed out in British patent GB 2115511 A to Godsted, when masonry is exceptionally hard, such as masonry whose aggregate is formed of granite, then in order to turn a screw-type masonry anchor into a hole drilled therein, the torque required for this purpose is very high. So high, in fact, that when seeking to screw an anchor into the masonry hole, the anchor could then break.

To create an anchor capable of being screwed into a hole drilled in exceptionally hard masonry, Godsted's anchor is provided with a helical thread having a V-shaped crosssectional configuration in which the flanks of the thread intersect at an included angle of 50 to 65 degrees. While this sharp thread is capable of cutting into hard masonry, it is relatively fragile and therefore may rupture when screwed into the masonry hole.

The screw-type masonry anchor disclosed in the Ernst U.S. Pat No. 3,937,119 has a sharp-crested helical thread in which notches are formed in the crests of the thread to facilitate embedment of the crests in the bank of the drilled masonry hole. Aggregate particles cut from the bank of the masonry hole by the notches in the crest are collected in a reservoir in the space between successive convolutions of the thread.

According to Ernst, because the particles are collected, they do not produce torsional friction and make it possible to turn the anchor into the hole at relatively low torque levels. Also according to Ernst, the retention of these particles in the reservoirs "would enhance the pull out force of the anchor." But Ernst does not explain how loose particles in this reservoir act to enhance the resistance of the anchor to axial pull out forces.

The Bickford U.S. Pat No. 5,531,553 discloses a self-tapping masonry anchor having a helical cutting thread surrounding the shank of the anchor. This cutting thread is formed by a pair of parallel helical ridges having a depressed groove therebetween serving to collect substrate debris removed by the cutting action.

To facilitate self-tapping, the helical land separating the successive convolutions of the parallel ridges has a width measured axially with respect to the shank of at least 4 mm and at least 50% of the land shank diameter. The helix angle of the helical ridge in Bickford is at least 10%.

In Bickford, even if particulate debris collected in the groove in the helical cutting thread were compacted therein, it would only serve to resist displacement of the helical thread with respect to the corresponding female thread cut into the bank of the hole. But it would not serve to significantly enhance the holding power of the anchor.

Also in Bickford whose cutting thread has two parallel ridges, these ridges are in close proximity to each other, with a broad land between successive convolutions of the thread. The propinquity of the ridges does not allow each individual ridge to utilize the maximum shear strength available in the masonry material Of greater prior art interest is the Tajima U.S. Pat. No. 4,652,194 in which particulate debris produced by the cutting action of a screw-type anchor serves to enhance the holding power of the anchor. Tajima points out that prior to his invention it was known to exploit the space between successive convolutions of the thread to collect and compact therein debris produced by the cutting thread to increase the pull-out resistance of the anchor.

According to Tajima, the spaces in prior art anchors were unduly large and it was therefore not possible for these spaces between successive convolution to be completely filled up and tightly compacted with particles to wedge the anchor in the hole.

To overcome this drawback, Tajima provides a triangular indentation in the land between successive convolutions of his helical thread. This indentation is filled with particles scraped off the bank of the masonry hole by the cutting action of the thread. However, an indented land creates a relatively large space and the particles in the space may not become tightly compacted to wedge the anchor in the hole.

SUMMARY OF INVENTION

In view of the foregoing, the main object of this invention is to provide a self-tapping, screw-type anchor for fastening an attachment to masonry, the anchor being screwed into a hole drilled in the masonry and being mechanically retained therein to resist pull-out forces, the holding strength of the anchor being enhanced by compacted particulate debris that creates a mass that wedges the anchor in the hole.

More particularly, an object of this invention is to provide an anchor of the above type in which the anchor is mechanically retained in the hole by multiple lead male cutting threads surrounding the shank of the anchor which intermesh with female threads cut into the bank of the hole, and in which particulate debris produced by this cutting action is compacted to create a dense mass that jams the anchor in the hole.

Among the significant advantages of an anchor in accordance with the invention are the following:

A. Because the anchor has multiple-lead helical cutting threads, it becomes possible to maximize the holding power of the anchor by spacing the threads to an optimum degree to attain the greatest shear strength of the masonry material.

B. Because the anchor has multiple-lead male cutting threads, it is possible to have a high helix thread and therefore quick entry, yet have a large number of convolutions along the length of the anchor which cut a like number of female threads in the bank of the masonry hole, thereby developing a high resistance to axial pull-out forces.

C. Because the anchor has multiple-lead helical cutting threads it has lower torque requirements than an anchor having a single or double-ridge thread and is easier to install.

D. Because the anchor is wedged into the masonry hole, it is highly resistant to back-out torques and is therefore not subject to loosening by vibratory or shock forces.

E. Because of the multiple lead threads, this keeps the anchor properly oriented along the center line of the drilled masonry hole during installation. Hence the anchor is prevented from leaning to one side as may occur when using an anchor having a single helical cutting thread.

Briefly stated, these objects are attained by a screw-type, self-tapping masonry anchor for fastening a fixture or other attachment to masonry in which a hole is drilled to receive the anchor. The anchor is provided with a shank having a root section surrounded by at least two helical male cutting threads whose crest diameters exceed the diameter of the hole whereby when the anchor is screwed into the hole, the cutting threads then cut corresponding female threads into the bank of the hole to mechanically retain the anchor therein to impart to the anchor a holding strength that resist axial pull-out forces.

Formed on the root in the helical land between successive convolutions of the thread is a ridge that is raised above the root of the thread to define between the ridge and the bank a compacting zone. Particulate debris produced by the cutting action and discharged into the land is forced into the compacting zone to create a dense mass that wedges the anchor in the hole and thereby enhances the holding power of the anchor.

BRIEF DESCRIPTION OF DRAWING

For a better understanding of the invention, as well as other objects and further features thereof, reference is made to the following detailed description to be read in conjunction with the accompanying drawing, wherein.

DESCRIPTION OF INVENTION

Figure 1:
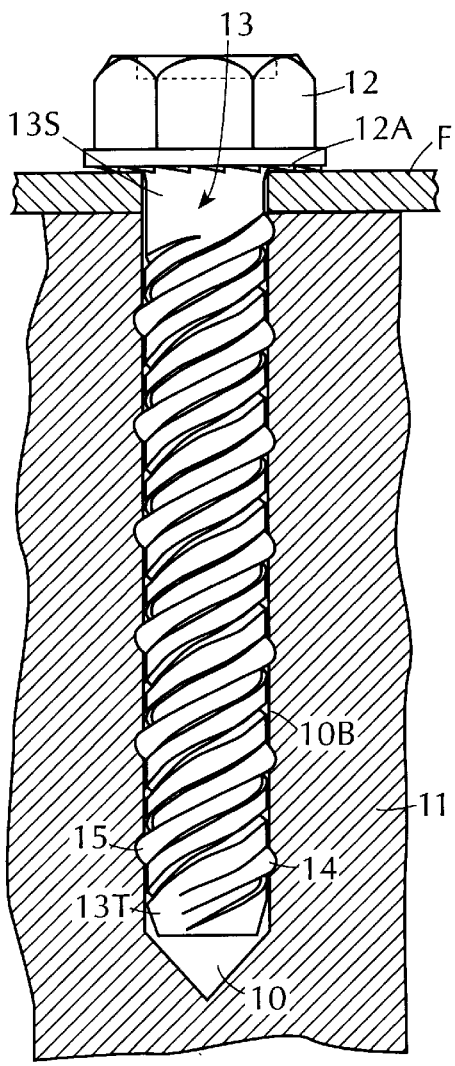
FIG. 1 shows a screw-type, self-tapping masonry anchor in accordance with a first embodiment of the invention installed in a hole drilled in masonry to fasten an attachment thereto.
Figure 1A:
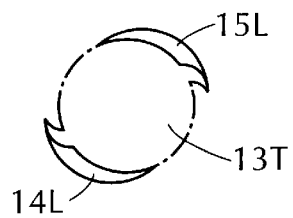
FIG. 1A is a schematic end view of the anchor.
Figure 2:
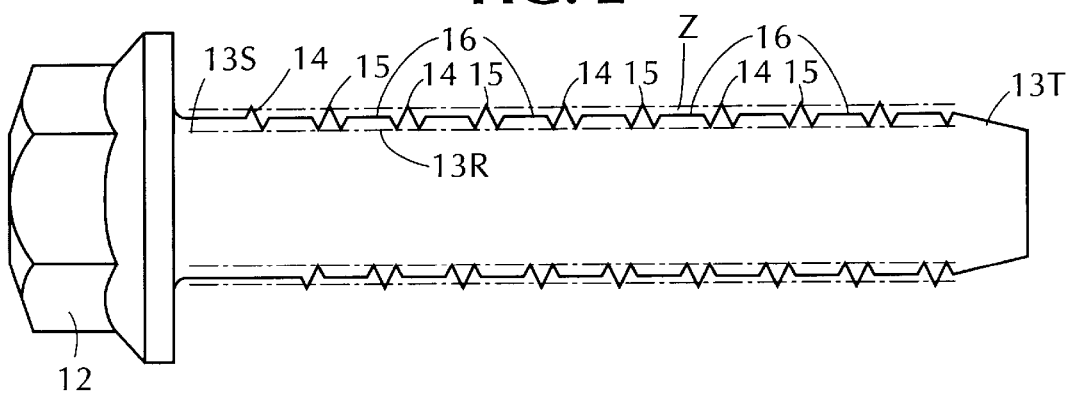
FIG. 2 is a profile of the anchor shown in FIG. 1.

First Embodiment:

Referring now to FIGS. 1, 1A and 2, shown in these figures is a self-tapping screw-type anchor in accordance with the invention installed in a hole 10 drilled in a masonry body 11 to fasten a fixture F or other attachment thereto. The anchor is inserted into the masonry hole through a mounting hole in the fixture in registration with the masonry hole. The masonry is formed of concrete or other stone-like masonry material.

The anchor which is fabricated of heat-treated, hardened steel or other high-strength, corrosion-resistant metal has an enlarged head 12 in a hexagonal shape so that it can be engaged by a wrench or other torque-producing tool to turn the anchor into the hole. The underside 12A of head 12 is serrated to fictionally engage the surface of the fixture when tightening the fastening.

The masonry anchors disclosed herein are all of the bolt type having an enlarged head. In practice, however, the anchor may be of the stud type in which the upper end of the anchor is externally threaded and extends through the mounting hole of the fixture to be fastened, a nut turned on the upper end of the stud being tightened against the surface of the fixture.

Integral with head 12 of the anchor and extending axially therefrom is a shank 13 having a short upper section 13S whose diameter is somewhat smaller than that of the drilled masonry hole 10. The remaining portion of the shank is constituted by a cylindrical root section 13R, the diameter of which is slightly reduced with respect to that of the upper section 13S. Root section 13R of the shank terminates at its leading end in a tip 13T having a frusto-conical form to guide the leading end of the shank into the masonry hole.

Surrounding root section 13R and running its full length are two helical male cutting threads 14 and 15 having identical pitches, each thread having a series of convolutions. Successive convolutions of the two threads are equispaced so that the outward appearance of the anchor is that of a single thread. As shown in FIG. 1A, leads 14L and 15L of the two threads 14 and 15 are 180 degrees out of phase; hence the cutting action of thread 14 and that of thread 15 are concurrent.

The crest diameter of the convolutions of the two cutting threads 14 and 15 is somewhat greater than the diameter of drilled hole 10. Hence when the anchor is screwed into the hole, the threads cut and tap the bank 10B of the hole to form two female threads therein. The intermeshing male and female threads mechanically retain the anchor in the masonry hole and offer high resistance to axial pull-out forces. While the crest diameter of threads 14 and 15, as shown in FIG. 1 are identical, in practice the crest diameters may be different as long as they exceed the diameter of the drilled hole.

Figure 3:
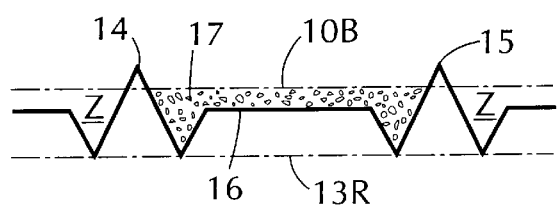
FIG. 3 illustrates the manner in which particulate debris produced by the cutting action of the anchor acts to jam the anchor in the masonry hole.

As best seen in FIGS. 2 and 3, formed in the helical land running between successive convolutions of the two cutting threads 14 and 15 is a ridge 16 which is raised above root 13R of the anchor. Hence the flat upper surface of the ridge is adjacent the bank 10B of hole 10 drilled in the masonry. The space between the truncated surface of the ridge 16 and the bank of the hole defines a compacting zone Z.

When the anchor is turned into the masonry hole, the two male cutting threads 14 and 15 cut into and tap the bank 10B of the hole. Because the material which forms the masonry is friable, this cutting action produces a particulate debris which is discharged into the land between successive convolutions of the two threads. The particulate debris accumulated in the land is forced into compacting zone Z to form a dense mass which enhances the holding power of the anchor.

While the anchor is shown as having two cutting threads whose leads are 180 degrees apart, in practice a multiple-lead thread anchor may have three helical cutting threads with the leads thereof displaced 120 degrees from each other. Or it may have a greater number of multiple threads depending on the masonry into which the anchor is to be installed.

In a preferred embodiment of a twin thread anchor in accordance with the invention, the thread pitch is ¾ of an inch; and the space between successive convolutions is ⅜ of an inch, hence the width of the land is relatively small as compared to the diameter of the root and to the pitch of the thread. The pitch of the anchor determines the extent of its axial advance for each full revolution of the anchor. With each full revolution of this embodiment of the anchor, it advances ¾ of and inch into the masonry hole. This makes possible a relatively fast installation, as well as enhanced holding power.

It is to be noted that between each flank of the cutting thread an the adjacent end of the raised ridge 16 there is a generally triangular recess to receive the particulate debris cut from the bank of the hole by the cutting thread.

The multiple-lead threads of the anchor keep the anchor properly oriented along the centerline of the drilled anchor during installation, thereby preventing the anchor from leaning to either side, as may occur when a single lead thread anchor is used. And because of the wedging action produced by the dense mass of compacted particulate debris jammed between the helical ridge of the anchor and the bank of the masonry hole, the anchor is highly resistant to back-out torque forces and is therefore not subject to loosening of the anchor as a result of shock and vibratory forces to which the installation is exposed.

It is important to note that the helical land between successive convolutions of the thread has a width measured axially which is well less than one half of the pitch of the thread, as is clearly evident in FIG. 2. Hence there are several dense masses of particulate matter above the land between successive convolutions along the length of the anchor. These serve to firmly wedge the anchor in the masonry hole.

Operating Principles:

In terms of mechanical engineering and mechanical advantage, a screw is an inclined plane wrapped around a cylinder so that the height of the plane is parallel to the axis of the cylinder. The mechanical advantage of a screw-type masonry anchor is the ratio of the force produced by the anchor when it enters a hole drilled in masonry to cut and tap the bank of the hole to the force applied to the anchor to effect this action.

For a screw-type masonry anchor having a helical cutting thread, a torque force must be applied to the anchor in order to have the anchor turn into the masonry hole. Hence the higher the mechanical advantage of the screw-type anchor, the less is the required torque force to turn the anchor into the drilled masonry hole.

The pitch of the anchor cutting thread determines the extent to which the anchor advances axially into the drilled hole for each revolution of the anchor. If therefore the pitch of the thread is such as to create a large number of convolutions along the length of the anchor shank, it will take an equal number of turns of the anchor to advance it fully into the drilled masonry hole. Hence in this instance, the installation time will be relatively long.

The pitch of a screw is determined by the slope or helix angle of the thread, the greater the angle, the greater the distance between successive convolutions. The advantage of a screw-type masonry anchor having a single male helical cutting thread whose pitch angle is such that the anchor has a large number of convolutions along its length, is that this anchor cuts into the bank of the drilled hole a correspondingly large number of female convolutions, thereby providing a high resistance to axial pull-out forces.

The drawback to a single thread anchor of this type is that it takes many turns of the anchor to install it in a masonry hole. This precludes fast installation of the anchor as is often necessary on a construction site where hundreds of anchors must be installed.

With a multiple-lead, twin-thread anchor in accordance with the invention, the pitch of the thread is such as to make possible a fast installation of the anchor with relatively low torque forces. However, fast installation and low torque are not at the expense of the holding power of the anchor, for the twin thread provides a large number of equal-spaced convolutions along the length of the anchor shank. These in conjunction with the female convolutions cut into the bank of the hole afford a high pull-out resistance.

This pull-out resistance which determines the holding power of the anchor is significantly enhanced by the dense masses of particulate debris wedged between each ridge in the land between successive convolutions of the two threads and the bank of the hole.

In the context of a self-tapping anchor that screws into a hole drilled in masonry, an anchor in accordance with the invention having multiple-lead cutting threads has many highly significant advantages over an anchor having only a single helical cutting thread.

The holding power of a steel masonry anchor having a male cutting thread that cuts a female thread into the bank of the masonry hole is a function of the depth of the cut. For example, if the depth of the cut is .015 inches, then the anchor has a certain holding power and generates a small amount of particulate masonry debris. But if one wishes to double the holding power, it is necessary to just about double the depth of the cut.

The typical male cutting thread has the crossection of an isosceles triangle whose peak is the cutting edge. Hence in order to cut into the bank of the hole to a depth twice 0.015 inches requires this the removal of four times as much particulate material from the bank of the hole, for there is much less area in the triangular upper half of the triangle than in the trapezoidal lower half thereof.

As a consequence, a masonry anchor having two helical male cutting threads which cut into the bank of the masonry hole to a depth of 0.015 inches, will give rise to the same holding power as a single thread that cuts to a depth of 0.030 inches. But in doing so the two threads act to carve out only half as much of the masonry material and therefore require less torque to screw the anchor into the hole.

Thus a multiple-lead thread masonry anchor in accordance with the invention requires installation torques that are greatly reduced, yet achieve the same holding power as that produced by a single thread anchor. And with multiple-lead threads, it is possible to employ a large helix angle to achieve fast installation of the anchor and still have enough thread engagement in all thread flank surfaces to utilize the full shear strength of the masonry.

Other Embodiments:

In the first embodiment of the masonry anchor shown in FIG. 1, the ridge 16 which is raised above the root helical land in the section has a flat upper surface. The compacted dense mass of particles in the compacting zone Z between the ridge and the bank of the masonry hole serves to wedge the anchor in the hole.

It is to be noted that a hole drilled in masonry by a conventional carbide-tipped drill is usually not perfectly straight, but has irregularities therein. The reason for this is that the drill pit shank has a significantly smaller diameter than the carbide tipped insert. Hence as the drill encounters hard aggregate in the concrete being drilled, the drill may be deflected to either side and does not drill a perfectly straight hole.

As a consequence of irregularities in the drilled hole, the space between the bank of the hole and the surface of helical ridge is not uniform along the length of the anchor. The resultant configuration of this space may be such as to cause the development of excessive driving torques.

Figure 4:
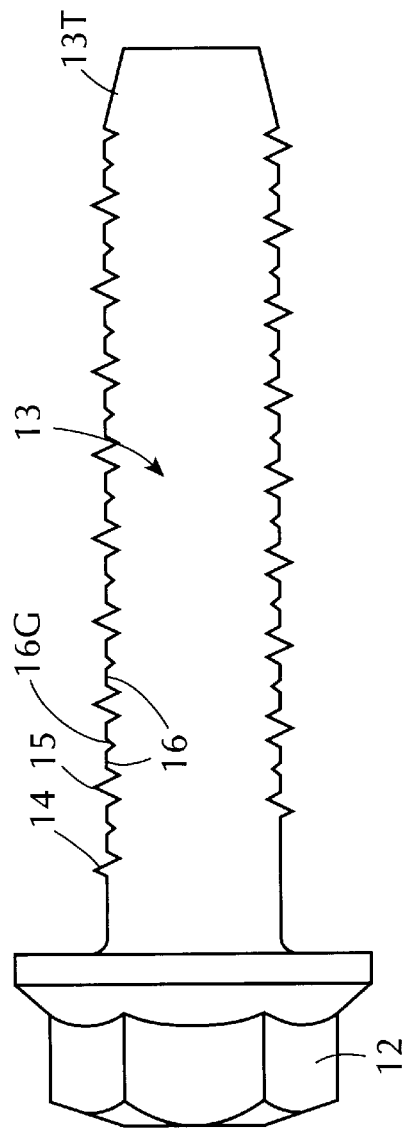
FIG. 4 is a second embodiment of an anchor in accordance with the invention.

In order to avoid such torque build up in large size anchors, the anchor shown in FIG. 4 is identical to that in FIG. 2, except that the flat upper surface of the helical ridge 16 is provided with a groove 16G that runs longitudinally along the center line of the helical ridge. Particulate matter forced into this groove resists such development.

Figure 5:
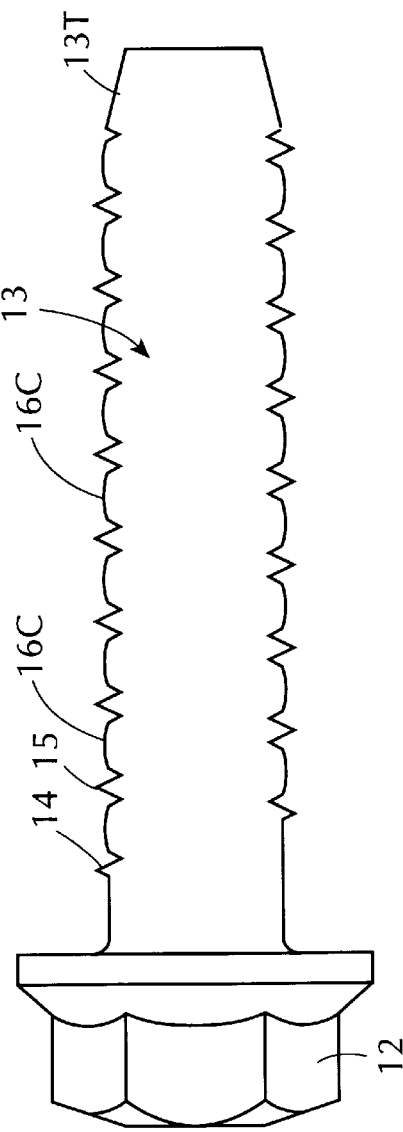
FIG. 5 is a third embodiment of the anchor.

The anchor shown in FIG. 5 is identical to that shown in FIG. 2, except that instead of a flat upper surface the helical ridges 16C is provided with a convex upper surface. Hence the dense mass of particulates conforms to the convex upper surface in the compacting zone which resists displacement of the mass.

While there has been shown and described preferred embodiments of an enhancing strength screw-type masonry anchor in accordance with the invention, it will be appreciated that many changes may be made thereon within the spirit of the invention.

We claim:

1. A screw-type self-tapping masonry anchor for fastening an attachment to friable masonry having a hole drilled therein to receive the anchor, the hole having a predetermined diameter:

A. a shank having a root section whose diameter is smaller than that of the hole; said shank being integral with a head adapted to be engaged by a torque-producing tool;

B. at least one helical male cutting thread surrounding the root, said thread having a crest diameter exceeding that of the hole whereby when the head is engaged by the tool and the anchor is screwed into the hole, the male cutting thread then cuts a female thread into the bank of the hole to mechanically retain the anchor and resist pull-out forces to impart holding strength to the anchor, convolutions of the thread having a helical land therebetween; and C. a ridge formed in the helical land and raised above the root to a degree creating in a space between the ridge and the bank of the hole a narrow compacting zone whereby particulate debris from the friable masonry produced by the cutting action is discharged into said zone to produce a dense mass that wedges the anchor in the hole to enhance its holding strength.

2. An anchor as set forth in claim 1, having multiple helical male threads having like pitches, said threads having leads which are displaced in phase from each other, the convolutions of the multiple threads being equi-spaced from each other.

3. An anchor as set forth in claim 1, having two helical threads having like pitches, the convolutions of the two threads being equi-spaced along the root, and having leads which are displaced 180 degrees from each other.

4. An anchor as set forth in claim 1, in which said ridge has a flat surface.

5. An anchor as set forth in claim 4, in which the flat surface has a groove therein that extends longitudinally along the helical ridge.

6. An anchor as set forth in claim 1, in which said ridge has a convex surface.

7. An anchor as set forth in claim 1, in which the anchor is formed of hardened steel and is rolled to create said helical threads.

8. A screw-type self-tapping masonry anchor for fastening an attachment to masonry having a hole of predetermined diameter drilled therein; said anchor comprising:

A. a shank having a root whose diameter is smaller than that of the hole; and

B. a plurality of helical male cutting threads surrounding the root having like helix angles and crest diameters larger than the drilled hole, said cutting threads forming convolutions which are substantially equi-spaced along the root to produce multiple convolutions along the root whereby when the anchor is turned into the masonry hole it advances at a rate determined by the pitch of the threads to cut a corresponding number of female threads in the bank of the hole, thereby enhancing the resistance of the anchor to pull-out forces.

9. A masonry anchor as set forth in claim 8, wherein successive convolutions of the plurality of male cutting threads have a helical land therebetween whose width, measured axially along the root, is less than one half the pitch of the thread.

10. A screw-type masonry anchor which is screwable into a hole of predetermined diameter drilled in masonry, said anchor comprising:

A. a shank having a root whose diameter is smaller than the diameter of the hole; and B. at least two helical male cutting threads having like helix angles surrounding the root and having respective crest diameters exceeding the diameter of the hole to cut corresponding female threads in the bank of the hole; said two threads having leads which are angularly displaced to form multiple equi-spaced convolutions along the root to define a helical land therebetween into which is discharged particulate debris produced by the cutting action on the masonry.

11. An anchor as set forth in claim 1, in which formed on the helical land is a raised ridge which defines a compacting zone between the ridge and the bank of the hole into which said debris is force to produce a dense mass that acts to wedge the anchor on the hole.

* * * * *